United States Patent

[11] 3,607,007

[72] Inventors Vincent Chiola
 Towanda;
 Phyllis R. Dodds, Wysox; Tai K. Kim,
 Towanda, all of Pa.
[21] Appl. No. 837,925
[22] Filed June 30, 1969
[45] Patented Sept. 21, 1971
[73] Assignee Sylvania Electric Products Inc.

[54] SEPARATION OF MOLYBDENUM VALUES FROM TUNGSTEN VALUES BY SOLVENT EXTRACTION
 6 Claims, No Drawings

[52] U.S. Cl. ............................................. 23/22,
 23/23, 23/51, 23/140, 23/15 W, 23/312 ME
[51] Int. Cl. ................................................. C22b 59/00,
 C01g 39/00
[50] Field of Search ........................................ 23/15, 5,
 18–20, 22–24, 51, 312 ME

[56] References Cited
 UNITED STATES PATENTS
 2,860,031 11/1958 Grinstead .................... 23/23 X
 FOREIGN PATENTS
 967,823 8/1964 Great Britain ............... 23/(15.5)

OTHER REFERENCES
 Jenkins et al., " Journal of Applied Chemistry," Vol. 14, Oct. 1964, pp. 449– 454, 23/15.5

*Primary Examiner*—Herbert T. Carter
*Attorneys*—Norman J. O'Malley, Donald R. Castle and William H. McNeill ABSTRACT: A process for the recovery of molybdenum values from a concentrated mineral acid solution that also contains tungsten as a contaminant is disclosed. The process comprises contacting an acid solution that has a mineral acid concentration of at least one normal acid solution with an organic extractant phase consisting essentially of monohexadecyl phosphoric acid and a water-insoluble hydrocarbon, as a solvent, to extract at least a portion of the molybdenum from the acid, separating the molybdenum-pregnant organic phase and the spent acid solution, thereafter contacting the molybdenum-pregnant organic solution with an aqueous strip solution containing a source of ammonium ions to remove at least a portion of the molybdenum from the organic phase, separating the resulting ammonium molybdate strip solution from the molybdenum-barren organic phase and recovering said strip solution as a solution of ammonium molybdate that is essentially free of tungsten.

SEPARATION OF MOLYBDENUM VALUES FROM TUNGSTEN VALUES BY SOLVENT EXTRACTION

BACKGROUND OF THE INVENTION

This invention relates to a new method for reclaiming molybdenum from concentrated mineral acid solutions. More particularly, it relates to a liquid-liquid solvent extraction process whereby tungsten-free molybdenum is recovered from an acidic molybdenum solution by transfer to an organic extractant and followed by recovery of molybdenum values as aqueous ammoniacal molybdate solutions suitable for further processing by conventional methods.

Molybdenum mandrels are used in the production of tungsten wire products, coils and the like. After processing of the wire products, the mandrels contaminated with tungsten, are generally dissolved in an acidic etch solution consisting of, for example, 30 vol. % nitric acid, 30 vol. % sulfuric acid, and 40 vol. % water. The mandrel etch solution typically contains 5–15% molybdenum and 2–5% tungsten, as an impurity. Heretofore, the solution was sewered. Currently, some form of reclamation is necessary to reduce water pollution. One method to achieve the reclamation is by the neutralization of the solution with ammonium hydroxide and recovering the molybdenum values by a method hereinafter given. For example, the addition of ammonium hydroxide to neutralize the etch solution at 110° C. yields, upon cooling to 20° C., a solid mixture of ammonium sulfate, ammonium paramolybdate, and ammonium nitrate. Subsequent firing of the material at 500° C. to convert the ammonium paramolybdate to molybdenum trioxide ($MoO_3$) and to volatilize the sulfate and nitrate which are present, yields a product ($MoO_3$) that contains up to about 5% by weight of tungsten.

Some of the disadvantages of this method are readily apparent, as for example, the amount of $NH_4OH$ necessary to neutralize the acidic solution is excessive because a mole of $NH_4OH$ is required for each mole of acid. The addition of the large quantities of $NH_4OH$ further dilutes a very dilute molybdenum-containing starting material. Additionally, tungsten precipitates with the molybdenum and further processing or purification steps are necessary to generate a relatively pure molybdenum product that is required for metallurgical applications. The product yield is too low to be economically and efficiently geared to production processing. In addition, burning of such large quantities of sulfates and nitrates generates atmospheric pollution problems.

In copending patent applications Ser. No. 837,894 and Ser. No. 837,777 filed concurrently herewith, extraction processes for the recovery of molybdenum from sources that are contaminated with tungsten, such as technical-grade $MoO_3$ or molybdenum containing ores, are disclosed. In these methods the conversion to sodium or potassium molybdate solutions occurs first, then this product is acidified by a mineral acid to yield a solution having a pH of from about 1 to 3.

These methods use specific extractants that will not operate efficiently under conditions employed in the process of the present invention.

It is believed therefore, that a process that would recover molybdenum that is essentially tungsten-free from such acid solutions directly, without pollution problems, would be an advancement in the art.

SUMMARY OF THE INVENTION

In accordance with one aspect of this invention there is provided a process wherein the before-mentioned concentrated molybdenum-containing acid solution is contacted with a water-insoluble extractant solution consisting essentially of monohexadecyl phosphoric acid (MHDPA) and a hydrocarbon solvent for a period of time sufficient to extract at least a portion of the molybdenum values from said concentrated acid, separating the spent acid solution and the resultant molybdenum-pregnant organic solution, contacting said organic solution with an aqueous strip solution containing ammonium ions to remove the molybdenum values from the organic solution; separating the organic and strip solutions and recovering said strip solution containing ammonium molybdate. Optionally, the organic extractant solution can be recycled.

For a better understanding of the present invention, together with other and further objects, advantages and capabilities thereof, reference is made to the following disclosure and appended claims in connection with the above description of one of the aspects of this invention.

DESCRIPTION OF THE PREFERRED EMBODIMENTS

The present invention yields a method to recover tungsten-free molybdenum from molybdenum-containing waste acid solutions that are contaminated with as much as 5% tungsten. The efficiency of recovery is generally greater than about 99% by using the solvent extraction technique of this invention.

The finding that tungsten-contaminated molybdenum, dissolved in an $H_2SO_4$-$HNO_3$ solution, can be essentially quantitatively and selectively extracted from such strongly acid solutions by monohexadecyl phosphoric acid in hydrocarbon diluent is believed to be surprising and unexpected. Numerous attempts to effect separation of molybdenum and tungsten under highly acid conditions have not, heretofore, been successful, probably because the specie of molybdenum-containing ions are believed to vary considerably depending upon the pH or acid concentration. Subsequent stripping of the molybdenum-loaded organic extractant by ammoniacal solutions results in the production of tungsten-free ammonium molybdate solution. Such solutions are further processable by normal methods such as crystallization, spray drying, kettle drying, firing, etc., to produce ammonium paramolybdate, ammonium polymolybdate, molybdenum trioxide, etc.

Alternatively, molybdenum scrap, such as floor sweepings, wire, sheets, etc. Can be added to the acid solution before processing. When available, the foregoing addition of otherwise waste materials yields additional benefits. For example, the concentration of molybdenum in the acidic solution is increased and the economics of the system are thereby improved. Additionally, the scrap molybdenum can be efficiently processed and recovered.

Generally, the concentration of molybdenum in the aqueous feed solution can vary from about 10% to about 60% by weight, depending on the amount of scrap molybdenum that is dissolved in acid solution. Low levels, that is below 10% do not effect the extraction of stripping capabilities or the recovery, however do lower the capacity of the system. A feed solution of greater than 10% concentration is preferred from a capacity and equipment investment viewpoint on the basis of cost per unit of $MoO_3$ processed. The molybdenum-containing acid solutions that are about 15 to 16 N upon the digestion of the molybdenum, can be diluted to any normality, but normalities of greater than 1 are preferred and normalities of from about 4 to about 10 are especially preferred since the higher molybdenum concentrations achieve more efficient results. Extreme dilution so that the pH of the solution is above about 0.5 is to be avoided since other nonextractable molybdenum species can occur.

The volume ratio of extractant to solvent can vary from about 5.95 to about 95:5, but a ratio of from about 10:80 to about 10:90 is preferred. Ratios outside the foregoing range of from about 5:95 to about 95:5 result in either poor efficiency and increased stages or are unnecessary and uneconomical. Although the hydrocarbon can be any water-insoluble hydrocarbon solvent such as the petroleum distillate solvents such as kerosene, toluene, benzene, naptha and the like, kerosene is preferred because of its cost, flash point and toxicity rating. The volumetric phase ratio of the organic extractant phase to aqueous acid solution can vary from about 6:1 to about 1:6, but ratios of from about 4:1 to about 6:1 are preferred.

The optimum number of extraction stages can vary depending upon the concentration of the acidic solution. For example, the optimum number of extraction stages is four when a 10 N acid solution is contacted with organic solution in a 4 to 1 organic to aqueous (o/a) ratio. Under these conditions an efficiency greater than about 99.5% is achieved. An efficiency of 98% is obtained when only three extraction stages are used under similar conditions. The number of stripping stages can also vary, generally from 1 to 3, depending on the efficiency level and the stripping agent used.

The time required for contacting the acid feed solution with the organic extractant solution can be varied, however, a time period from about 5 to about 25 minutes is preferred in order to achieve the best efficiency and throughput.

The ammoniacal stripping agents can be ammonium oxalates, citrates, hydroxides, or chlorides but about a 1N $NH_4Cl$ or about a 11N $NH_4OH$ stripping agent is preferred because of cost, efficiency, added impurities, ease of handling, and finished product obtained. Ammonium chloride can be used as a stripping agent, however, its use would depend upon whether or not the presence of chloride ions would be detrimental to the end use of the subsequently produced ammonium molybdate.

The time necessary to achieve removal of molybdenum from the organic solution by the stripping agent can be varied, however, at least about 5 minutes is necessary for good efficiency, that is greater than about 90%. A contact time greater than about 25 minutes is not necessary and needlessly prolongs the overall time cycle.

To more fully illustrate the invention, the following detailed nonlimiting examples are presented. All parts, ratios, proportions and percentages are by volume unless otherwise indicated.

EXAMPLE I

An extractant solution containing about 10% monohexadecyl phosphoric acid (MHDPA) using kerosene as a solvent, is used to contact (in a 1:1 organic to aqueous ratio) a waste, acidic molybdenum solution (15 N acid solution comprised of 75% $HNO_3$-25% $H_2SO_4$ in which about 15% by weight of molybdenum and about 3% by weight of tungsten are dissolved. Samples of the solution are diluted with deionized water from 14 N to 1 N and the period of contact is for 25 minutes on each sample. Analysis of the samples yield the following results:

| Sample | Normality of Molybdenum Acid Solution | Concentration Organic Extractant | Kd | Molybdenum (% extracted in weight %) |
|---|---|---|---|---|
| 1 | 1 | 10% MHDPA | 5.29 | 84.1 |
| 2 | 2 | 10% MHDPA | 5.01 | 83.3 |
| 3 | 3 | 10% MHDPA | 5.78 | 85.2 |
| 4 | 4 | 10% MHDPA | 5.84 | 85.3 |
| 5 | 5 | 10% MHDPA | 1.247 | 55.4 |
| 6 | 6 | 10% MHDPA | 1.171 | 53.9 |
| 7 | 7 | 10% MHDPA | 0.90 | 47.3 |
| 8 | 8 | 10% MHDPA | 0.72 | 41.8 |
| 9 | 9 | 10% MHDPA | 0.65 | 39.3 |
| 10 | 10 | 10% MHDPA | 0.63 | 38.6 |
| 11 | 11 | 10% MHDPA | 0.58 | 36.7 |
| 12 | 12 | 10% MHDPA | 0.52 | 34.2 |
| 13 | 13 | 10% MHDPA | 0.66 | 39.7 |
| 14 | 14 | 10% MHDPA | 0.50 | 33.3 |
| 15 | full strength | 10% MHDPA | 0.49 | 32.8 |

The results indicate that above a concentration of 4 Normal the extraction capability of MHDPA decreased sharply when a 1:1 o/a phase ratio is employed and the efficiency decreases some at concentrations less than 4 Normal. However, when higher o/a ratios are used, the tolerable acid strength or ion concentration is sharply increased as is shown below.

| Sample | Normality of Molybdenum Acid Solution | Organic | o/a Ratio | Kd | % Ex |
|---|---|---|---|---|---|
| 1 | 6 | 10% MHDPA | 2-1 | 0.812 | 61.9 |
| 2 | 7 | 10% MHDPA | 2-1 | 0.872 | 63.5 |
| 3 | 8 | 10% MHDPA | 2-1 | 0.768 | 66.5 |
| 4 | 9 | 10% MHDPA | 2-1 | 0.784 | 61.0 |
| 5 | 10 | 10% MHDPA | 2-1 | 0.727 | 58.2 |
| 6 | 6 | 10% MHDPA | 4-1 | 0.724 | 74.3 |
| 7 | 7 | 10% MHDPA | 4-1 | 0.775 | 75.6 |
| 8 | 8 | 10% MHDPA | 4-1 | 0.707 | 73.8 |
| 9 | 9 | 10% MHDPA | 4-1 | 0.702 | 73.7 |
| 10 | 10 | 10% MHDPA | 4-1 | 0.674 | 72.9 |

EXAMPLE II

A similar extractant solution, as in Example I, is contacted with acidic molybdenum-containing solutions, diluted to 4 N and in a 1:1, o/a ratio, for times ranging from 1 minute to 40 minutes. A contact time of 5 minutes is found to be adequate for extraction as is shown by the results of analysis of samples presented below.

| Sample | Time Minutes | Extraction Coefficient Kd |
|---|---|---|
| 1 | 1 | 0.767 |
| 2 | 5 | 1.14 |
| 3 | 10 | 1.16 |
| 4 | 25 | 1.19 |
| 5 | 40 | 1.18 |

EXAMPLE III

An extractant solution containing about 10% MHDPA-90% kerosene, containing about 85% by weight of molybdenum, is contacted with various suitable stripping agents. Results appear below:

| Stripping Agent | Organic | Stripping Coefficient | % Molybdenum Stripped |
|---|---|---|---|
| 0.5 N $NH_4Cl$ | Mo-containing MHDPA | 0.09 | 8.2 |
| 1.0 N $NH_4Cl$ | Mo-containing MHDPA | 11.02 | 91.6 |
| 3.0 N $NH_4Cl$ | Mo-containing MHDPA | 0.19 | 15.9 |
| 2.0 N $NH_4$ citrate | Mo-containing MHDPA | 0.671 | 40.1 |
| 5.0 N $NH_4$ citrate | Mo-containing MHDPA | 0.835 | 45.5 |
| 2.0 N $NH_4$ oxalate | Mo-containing MHDPA | 0.907 | 47.5 |
| 0.5 N $NH_4$ oxalate | Mo-containing MHDPA | 0.531 | 34.6 |
| 11.1 N $NH_4OH$ | Mo-containing MHDPA | 182.54 | 99.4 |

The above data indicates an improvement in stripping is achieved when about a 1 N ammonium chloride or about an 11 N ammonium hydroxide is used as a stripping agent. The other stripping containing ammonium ions can be used, however, more stripping stages are required to achieve a high level of recovery.

EXAMPLE IV

An acidic molybdenum acid solution, that contains tungsten, is tagged with $^{181}W$ and diluted to normalities ranging from about 1 to about 6. The aqueous solutions are contacted in a 1:1 o/a ratio with about a 10% MHDPA in kerosene for 10 minutes. Aliquots of both phases are counted and distribution coefficients obtained. No counts are detected in the organic phases even through the counts in the aqueous phases were high (>5,000 c.p.m.) It can be concluded that MHDPA is selective for molybdenum and that tungsten is not extracted.

EXAMPLE V

Molybdenum acid solution (15.6 N) is diluted to 4 N with deionized water and contacted with 10% MHDPA in kerosene for 5 minutes in a 1:1 o/a ratio. AFter settling, the aqueous phase is contacted with fresh organic extractant and continued for a third time. After three contacts over about 94.5% of the Mo is extracted. The organic solutions are combined and contacted with an equal volume of 1.0 N NH$_4$Cl. After two contacts a 99% tungsten-free molybdenum is stripped.

While there has been shown and described what is at present considered the preferred embodiments of the invention, it will be obvious to those skilled in the art that various changes and modifications may be made therein without departing from the scope of the invention as defined by the appended claims.

We claim:

1. A process for the recovery of molybdenum from a concentrated mineral acid solution containing tungsten, said process comprising:
   a. contacting a mineral acid solution having a normality of at least about 1 N, with an organic extractant solution consisting essentially of monohexadecyl phosphoric acid and a water-insoluble hydrocarbon solvent having a volumetric ratio of said acid to solvent of from about 5:95 to about 95:5, the volumetric ratio of said acid solution to said extractant solution being from about 1:6 to about 6:1, to extract at least some of said molybdenum;
   b. separating the resultant molybdenum-pregnant organic phase from the resulting aqueous spent acid solution;
   c. contacting said organic phase with an aqueous strip solution containing an ammonium ion source to remove at least some of said molybdenum from said organic phase;
   d. separating the resultant molybdenum-barren organic phase and the resultant ammonium molybdate strip solution; and
   e. recovering said ammonium molybdate strip solution that is essentially tungsten free.

2. A process according to claim 1 wherein said stripping solution is selected from about 1 N ammonium chloride and about 11 N ammonium hydroxide.

3. A process according to claim 2 wherein said acid solution is from about 4 N to about 10 N.

4. A process according to claim 3 wherein the concentration of molybdenum in said acid solution is greater than about 10% by weight.

5. A process according to claim 2 wherein said molybdenum-barren organic phase is recycled to contact said aqueous mineral acid solution.

6. A process according to claim 5 wherein said process is a continuous process.